Patented July 3, 1934

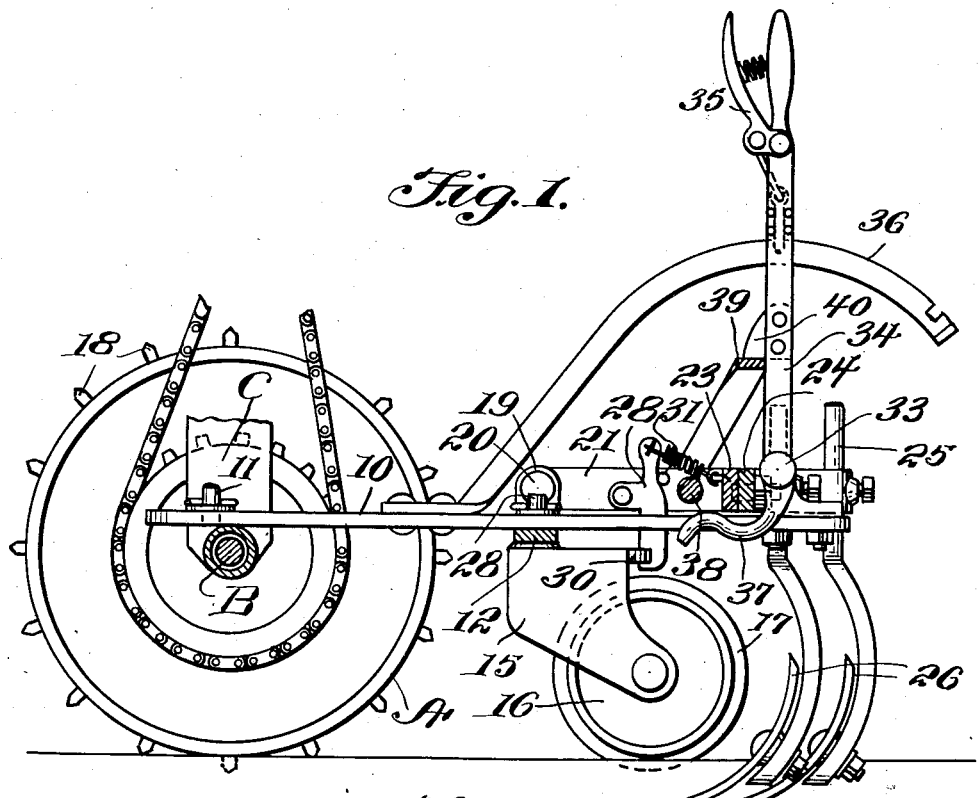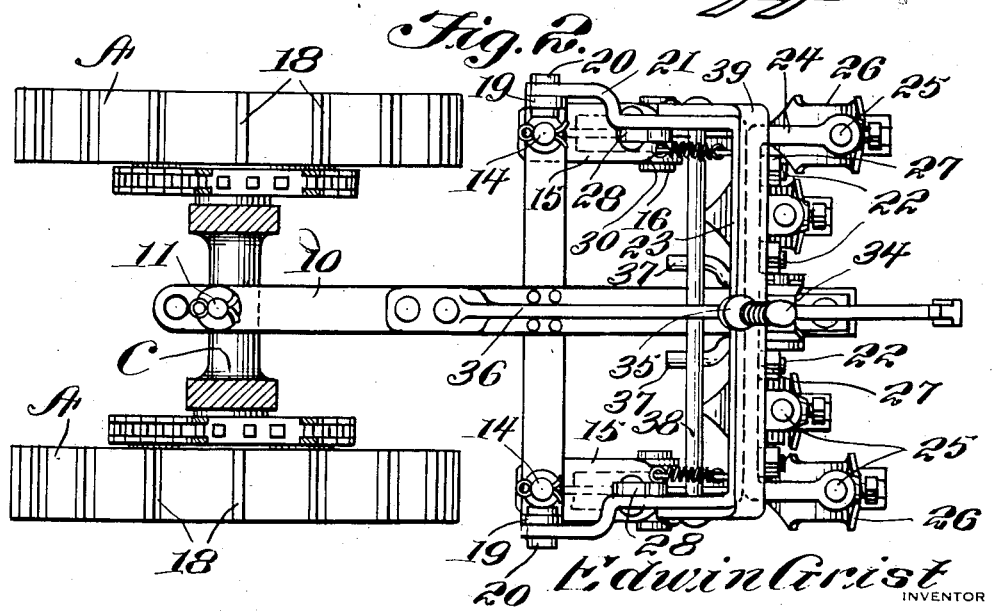

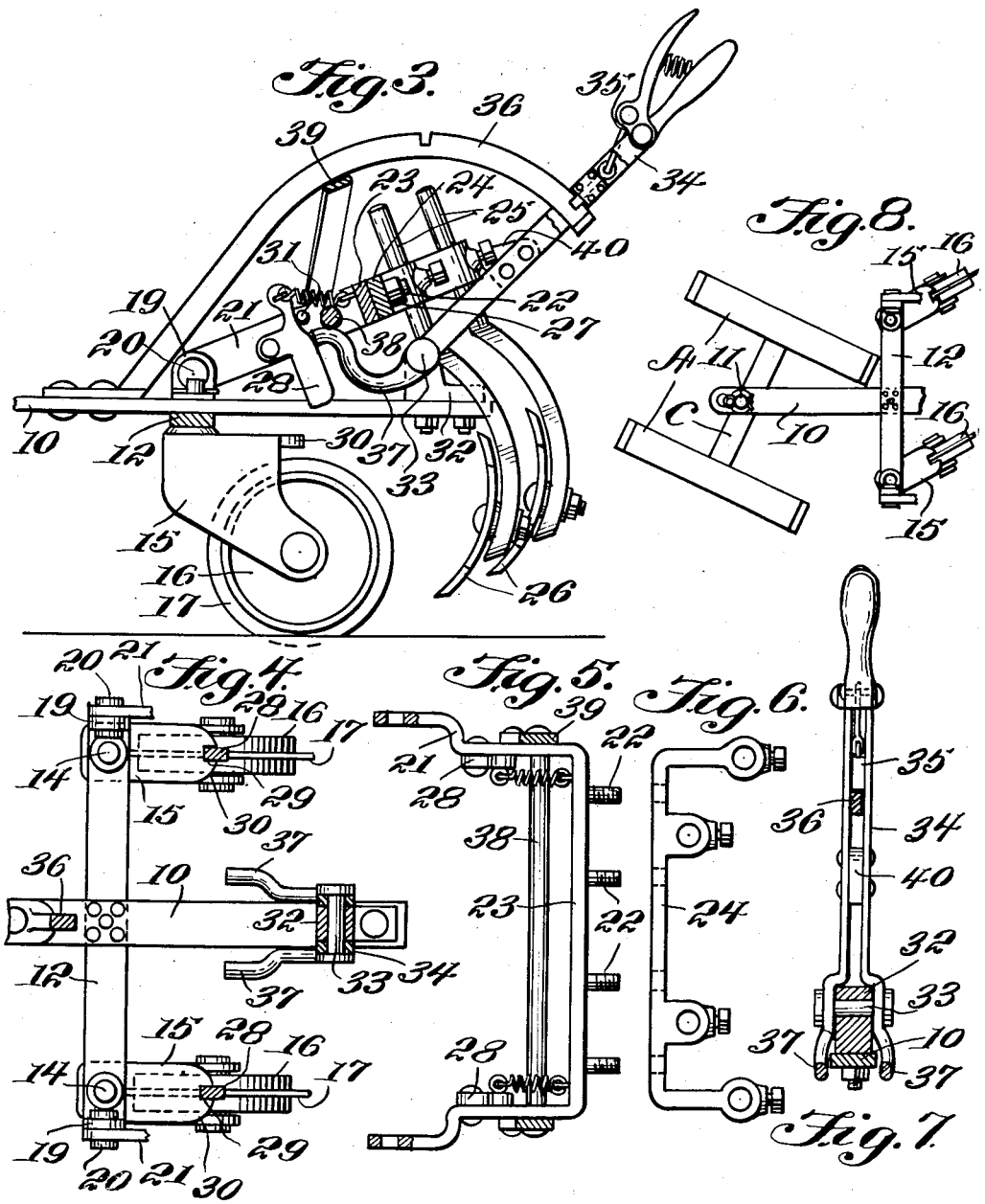

1,965,495

UNITED STATES PATENT OFFICE 1,965,495

IMPLEMENT HITCH

Edwin Grist, Kokomo, Ind.

Application November 7, 1933, Serial No. 697,030

3 Claims. (Cl. 97—48)

The invention relates to an implement hitch and more especially to trailers for garden tractors.

The primary object of the invention is the provision of a trailer of this character, wherein it avoids at all times the forward or backward tilt of a tractor when used therewith and also assures the tractor traveling on an even keel whether the ground working implement is cultivating or raised for turning or transportation.

Another object of the invention is the provision of a trailer of this character, wherein novelty exists in the attaching of the draw bar to a tractor and the operation of the wheels of the carriage of such trailer, thus assuring traction of the bull wheels without throwing the ground working implement or tool carriage to either side during draft or the carriage out of alignment, as such carriage will closely follow the tread of the bull wheels in steering and in and out of crooked rows of plants.

A further object of the invention is the provision of a trailer of this character which is comparatively simple in construction, thoroughly reliable and efficacious in its purposes, readily and easily controlled, strong, durable, and inexpensive to manufacture and install for service.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a fragmentary vertical longitudinal sectional view showing in elevation one bull wheel and the trailer in accordance with the invention.

Figure 2 is a horizontal sectional view showing in top plan the trailer.

Figure 3 is a fragmentary side elevation showing the ground working implement in raised position on the trailer.

Figure 4 is a fragmentary horizontal sectional view through the trailer.

Figure 5 is a detail plan view partly in section of the ground working tool mounting.

Figure 6 is a plan view of a part in association with the structure shown in Figure 5.

Figure 7 is a vertical transverse sectional view showing in detail the control lever and adjuncts.

Figure 8 is a fragmentary top plan showing the trailer when taking a turn while under draft.

Similar reference characters indicate corresponding parts throughout the several views in the drawings.

Referring to the drawings in detail, A designates generally a pair of bull wheels of a tractor of standard construction and B the axle of the bull wheels suitably journaled in a part of the frame C of the tractor. Hitched to this frame C is the trailer constituting the present invention and hereinafter fully described.

The trailer includes a draw bar 10 which, at its fore end, is pivoted as at 11 in any suitable manner at the center of the bull wheel axle midway between the bull wheels A to the frame B of the trailer.

Disposed crosswise intermediate of the draw bar 10 is a rail or bar 12 which is of a length equal to the distance between the outer sides of the bull wheels A and this bar, centrally thereof, is riveted or otherwise made fast at 13 to the draw bar. Swiveled near opposite ends, as at 14, to the bar or rail 12 are the forks or mountings 15 for caster wheels 16, these following closely the tread of the bull wheels A, the peripheries of the wheels 16 being circumferentially ribbed at 17 to avoid side slipping and to assure the following of the said wheels in stright alignment with the pull of the draw bar 10, the bull wheels being provided with anti-skid cleats 18, which is conventional.

Formed at the opposite ends of the bar 12 are upstanding bearings 19 for the horizontal pivots 20 connecting thereto a substantially U-shaped yoke or frame 21 which is adapted for vertical swinging movement. The yoke or frame carries threaded studs 22 which project outwardly from the straight intermediate portions 23 thereof and detachably engageable with these studs 22 is a hanger 24 in which are adjustably fitted the shanks 25 of ground working tools 26, in this instance being cultivator implements. The studs 22 have fitted thereto nuts 27 which detachably secure the hanger 24 on the yoke or frame 21.

To the sides of the yoke or frame 21 are pivoted spring tensioned latches 28, these engageable with keeper notches 29 formed in the rounded heads 30 of the forks or mounts 15 so as to latch the latter to have the wheels 16 in trailing alignment with the bull wheels A when the yoke or frame 21 is in lowered position with respect to the carriage constituting the trailer. The sides of the yoke or frame 21 are fitted with stop lugs 31 to limit the latching movement of the latches 28.

On the rear end of the bar 10 is a bearing 32 having pivoted at 33 thereto a raising and lowering lever 34 equipped with a hand releasable spring tensioned latching device 35 coacting with a keeper arm 36 fixed to the bar 10 and rising therefrom with a forwardly and downwardly disposed curvature. The lever 34, at its pivoted end, is formed with lifter prongs or horns 37, these being operable against a cross tie rod 38 carried by the yoke or frame 21. Thus it will be seen that when swinging the lever 34 on the unlatching thereof in a rearward direction the yoke or frame 21 can be raised from the position shown in Figure 1 to the position shown in Figure 3 of the drawings and in this position the ground working tools 26 will be elevated and out of working relation to the soil. When the yoke or frame 21 is raised it disengages the latches 28 from the heads of the forks or mounts 15 which previously have been latched to have the wheels 16 trail the bull wheels A in alignment under draft of the trailer and these forks or mounts 15, by their swivel connection, will be free to permit turning movement of the trailer congruous with the turning of the tractor. When the yoke or frame 21 is lowered and the forks or mounts 15 have been swung to either side of the path of the latch 28, on the straightening of such forks or mounts the latches 28 will ride against the curved edges 30 of the head of said forks or mounts for the automatic latching of the same in alignment with the pull or draft.

Rising from the yoke or frame 21 and carried thereby is an upwardly arched forwardly inclined keeper 39 with which engages a latching piece 40 on the lever 34 so that the said yoke or frame 21 can be locked in its lowered horizontal position with the ground working tools 26 active in the soil on the forward draft of the trailer, there being no liability of these tools 26 being forced out of working position in the soil by the accidental raising of the yoke or frame 21, the lever 34 being latched to the keeper arm in two selective positions, namely, for latching the yoke or frame 21 lowered, or raised.

What is claimed is:

1. A trailer of the character described comprising a draw bar for pivotal connection with a tractor, a pair of spaced swiveled caster wheels connected with said bar, a vertically swinging yoke on said draw bar, means on the yoke for latching the caster wheels in straight relation to a line of draft of the draw bar, a tool carrier detachably supported on said yoke, and means for raising and lowering the yoke.

2. A trailer of the character described comprising a draw bar for pivotal connection with a tractor, a pair of spaced swiveled caster wheels connected with said bar, a vertically swinging yoke on said draw bar, means on the yoke for latching the caster wheels in straight relation to a line of draft of the draw bar, a tool carrier detachably supported on said yoke, means for raising and lowering the yoke, and means in association with the last-named means for latching the yoke raised or lowered.

3. A trailer of the character described comprising a draw bar for pivotal connection with a tractor, a pair of spaced swiveled caster wheels connected with said bar, a vertically swinging yoke on said draw bar, means on the yoke for latching the caster wheels in straignht relation to a line of draft of the draw bar, a tool carrier detachably supported on said yoke, means for raising and lowering the yoke, means in association with the last-named means for latching the yoke raised or lowered, and ground working tools adjustably carried by the said tool carrier.

EDWIN GRIST.